(12) United States Patent
Jungerman et al.

(10) Patent No.: US 6,744,508 B2
(45) Date of Patent: Jun. 1, 2004

(54) SIMPLIFIED POLARIZATION INDEPENDENT OPTICAL SAMPLING USING A SPATIALLY SPLIT WAVEPLATE

(75) Inventors: Roger L. Jungerman, Petaluma, CA (US); Randall King, Santa Rosa, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 301 days.

(21) Appl. No.: 10/037,690

(22) Filed: Oct. 24, 2001

(65) Prior Publication Data
US 2003/0076496 A1 Apr. 24, 2003

(51) Int. Cl.[7] .............................. G02B 27/28; G01J 4/00
(52) U.S. Cl. .................... 356/364; 356/365; 359/494; 359/497
(58) Field of Search .................. 356/365–368; 359/494, 619, 640, 496, 497, 498, 244, 256; 117/1; 156/99

(56) References Cited

U.S. PATENT DOCUMENTS

| | | | |
|---|---|---|---|
| 5,627,676 A | * | 5/1997 | Borrelli et al. ............ 359/494 |
| 5,796,479 A | | 8/1998 | Derickson et al. |
| 6,236,507 B1 | * | 5/2001 | Hill et al. .................... 359/494 |
| 6,587,267 B2 | * | 7/2003 | Tai et al. ..................... 359/484 |
| 6,661,577 B1 | * | 12/2003 | Wu et al. ..................... 359/619 |

FOREIGN PATENT DOCUMENTS

JP 05-215918 8/1993

\* cited by examiner

*Primary Examiner*—Frank G. Font
*Assistant Examiner*—Layla Lauchman

(57) ABSTRACT

A method and apparatus for sampling optical input signal is presented. The apparatus includes a split waveplate for spatially rotating polarization direction of a first portion (for example half, or 50 percent) of the input signal to a first rotated direction and spatially rotating polarization direction of a second portion (for example the other 50 percent) of the input signal to a second rotated direction orthogonal to the first rotated direction. The apparatus further includes a sum frequency generator, for example a PPLN crystal, aligned to the first rotated direction to sample the input signal. The rotation of the two halves of the input signal is achieved using a split half-waveplate.

7 Claims, 2 Drawing Sheets

SIMPLIFIED POLARIZATION INDEPENDENT OPTICAL SAMPLING USING A SPATIALLY SPLIT WAVEPLATE

BACKGROUND

The present invention relates to optical signal technology. More specifically, the present invention relates to optical sampling of polarized signals.

Optoelectronics technology and its applications are expanding with the result that integrated optics technology can be used with considerable advantages in communications. In these communication systems, optical signals embody information bits at very high bit rates, for example, 160 Gigabits per second. Such optical signals are often sent via single mode optical fibers. When, an optical signal is received as an input signal, the bits of the input optical signal are sampled and converted to information. In the input optical signal, each bit may be represented an optical pulse having a waveform.

For measuring the waveforms of optical pulses used in high bit rate optical communications, it is common practice and desirable to use optical sampling with high sensitivity and high time resolution. Optical sampling systems often use a probe pulse signal and optical mixing with a user signal to achieve what is known as sum frequency generation (SFG) that is very useful for obtaining representations of sampled user signals. Some implementations of the sum frequency generation processes may use a nonlinear crystal such as, for example, a periodically poled lithium niobate (PPLN) crystal. See, for example, "Highly Sensitive and Time-Resolving Optical Sampling System Using thin PPLN Crystal" by S. Nogiwa, et al., Electron Lett, Vol. 36, IEEE 2000.

The PPLN and other optical devices operate most efficiently when its optical input signal has a particular polarization direction. However, the polarization direction of the input signal is difficult to determine. Moreover, the polarization direction of the input signal changes over time. Hence, the efficiency of the PPLN can swing widely from very high (for example, near 100 percent) when the polarization of the input optical signal is aligned with that of the PPLN to very low (for example, near zero percent) when the polarization of the input optical signal is orthogonal to that of the PPLN. Such unpredictable swings in sampling efficiency are undesirable. In fact, the unpredictability of the polarization of input optical signals and polarization direction changes of the input optical signals over time introduces difficulties in analysis of the input optical signal.

Accordingly, there is a need for a method and apparatus to minimize the difficulties associated with unpredictability of the input signal polarization.

SUMMARY

These needs are met by the present invention. According to one aspect of the present invention, a split waveplate is disclosed. A first half of the split waveplate has refractive index along a first direction and a second half of the split waveplate has refractive index along a second direction.

According to a second aspect of the invention, a split half-waveplate has a first half having refractive index along a first direction and a second half having refractive index along a second direction, the second direction being 45 degrees relative to the first direction.

According to a third aspect of the invention, a method of forming a split waveplate is disclosed. First, a waveplate having a directional refractive index is cut at 22.5 degrees off the direction of the refractive index to produce a first and a second portion of the waveplate. The second portion is flipped. Then, the split waveplate is formed by joining the first portion and the flipped second portion along the cut such that the direction of the refractive index of the flipped second portion is 45 degrees off from the direction of the refractive index of the first portion.

According to a fourth aspect of the invention, an apparatus for sampling optical input signal includes a split waveplate for spatially rotating polarization direction of a first portion of the input signal to a first rotated direction and spatially rotating polarization direction of a second portion of the input signal to a second rotated direction orthogonal to the first rotated direction. Further, a sum frequency generator generates sum frequency of the rotated input signal.

According to a fifth aspect of the present invention, a method of sampling optical input signal is disclosed. First, the input signal is spatially rotated such that one half of the power of the input signal is within a first polarized portion of the input signal while the other half of the power of the input signal is within a second polarized portion of the input signal, the second polarized portion being orthogonally polarized relative to the first polarized portion. Then the spatially rotated input signal is sampled.

Other aspects and advantages of the present invention will become apparent from the following detailed description, taken in conjunction with the accompanying drawings, illustrating by way of example the principles of the invention.

DETAILED DESCRIPTION

Figure 1:
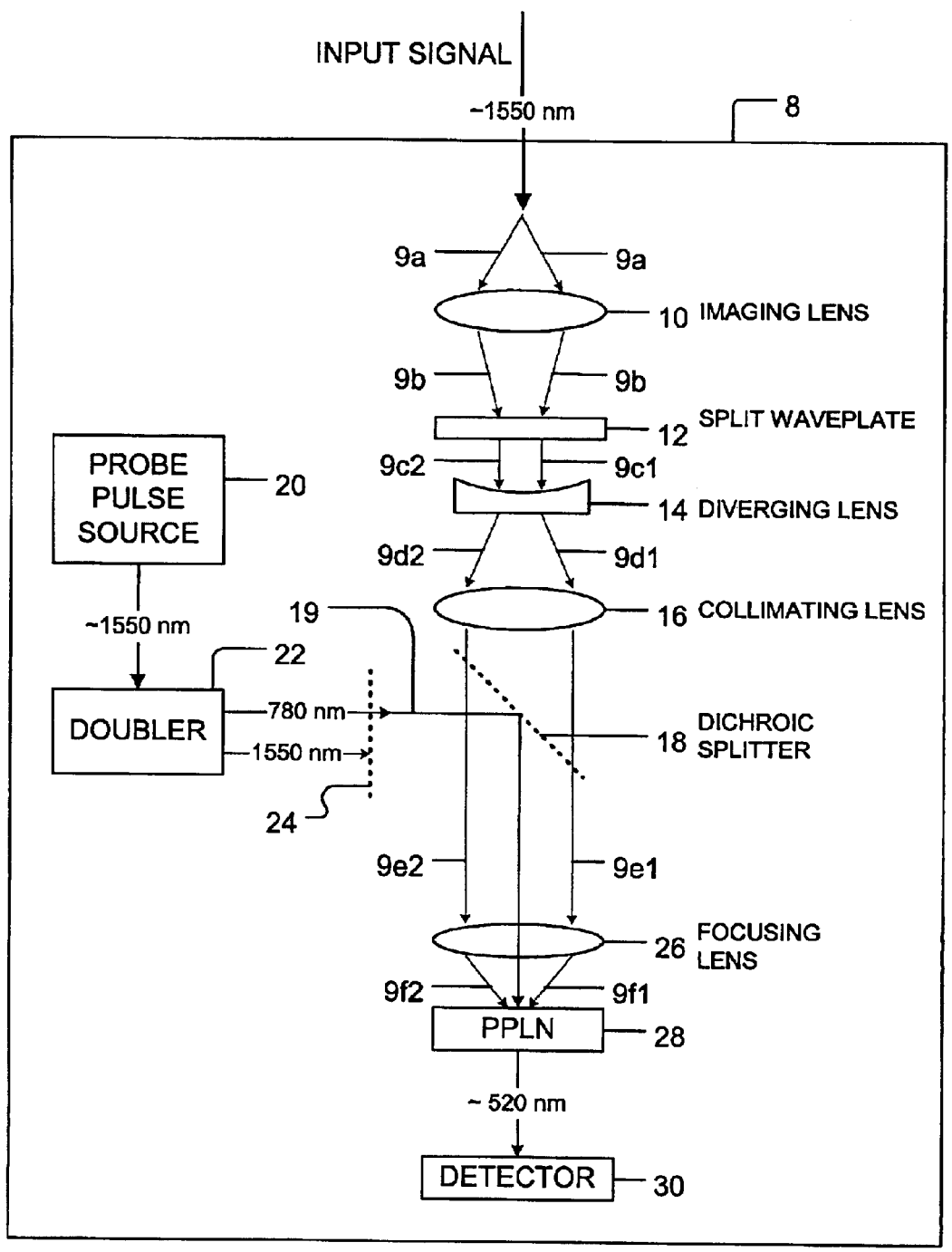
FIG. 1 is a simplified diagram of an optical sampling apparatus in accordance with one embodiment of the present invention.

As shown in the drawings for purposes of illustration, the present invention is embodied in a method of and apparatus for sampling optical input signal. The apparatus includes a split waveplate for spatially rotating polarization direction of a first portion (for example half, or 50 percent) of the input signal to a first rotated direction and spatially rotating polarization direction of a second portion (for example, the other 50 percent) of the input signal to a second rotated direction orthogonal to the first rotated direction. The apparatus further includes a sum frequency generator, for example a PPLN crystal, aligned to the first rotated direction.

As a result, independent of the polarization direction of the input signal, 50 percent of the power of the input signal is aligned with the alignment of the PPLN generator while the other 50 percent of the power of the input signal is orthogonal to the alignment of the PPLN generator. Consequently, the sampling efficiency of the apparatus stays consistent around 50 percent efficiency independent of the changes in the polarization direction of the input signal.

Referring to FIG. 1, a sampling apparatus 8 takes, as input, optical signal of approximately 1550 nanometers (nm)

wavelength. The input signal 9, can be modulated at high frequencies, for example, 40 Gigabits (GB) or 160 Gigabits per second. One Gigabit is one billion bits per second. In FIG. 1, path of the input signal through the apparatus 8 is indicated using vector lines and referred to using numeral 9 followed by a lower case letter, for example 9a, or followed by a lower case letter plus a number, for example, 9c1, and collectively referred to as the input signal 9. The input signal 9 and the vector lines 9a . . . 9z are used for convenience to indicate various aspects of the present invention, and do not represent ray traces as is sometime used in the art of optics.

The input signal 9 as it enters the apparatus is polarized in at least one direction. However, the direction of its polarization is not known to the apparatus 9, and the polarization direction of the input signal 9 changes over time. As the input signal 9 leaves its medium, for example optic fiber, the input signal 9 diverges as indicated by reference numeral 9a. An imaging lens 10 images the diverged input signal 9a onto a split waveplate 12.

Figure 2A:
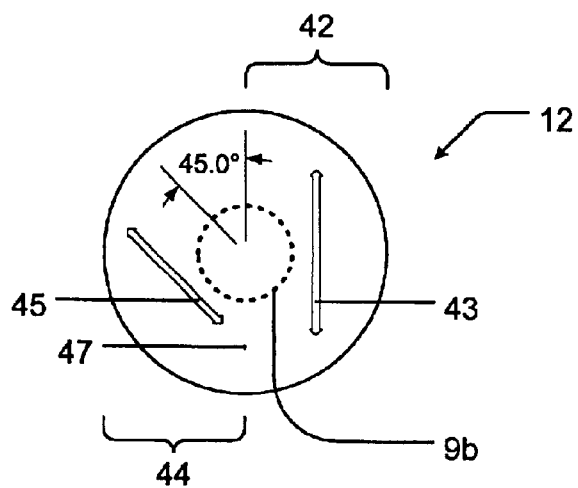
FIG. 2A illustrates a split waveplate according to one embodiment of the present invention.

One embodiment of the split waveplate 12 is illustrated in FIG. 2A. In the illustrated embodiment, the split waveplate 12 is a disc with a first half 42 having refractive index along a first direction as indicated by arrow 43 and a second half 44 having refractive index along a second direction as indicated by arrow 45. The second direction 45 is 45 degrees off relative to the first direction 43. Here, the split waveplate 12 is a half waveplate. The shape of the split waveplate 12 is not limited to disc-shape. In the present sample embodiment, the split waveplate is approximately 10 millimeters (mm) in diameter and consists of two quarts zero-order half-wave plates sandwiched between two glass plates, each 1 mm thick. These physical dimensions can vary depending upon the implementation and manufacturing constraints.

Behavior of half waveplates is known in the art. A polarized beam, or signal, incident on a half waveplate emerges as a polarized beam but rotated such that its angle to the optical axis is twice that of the incident beam. Therefore, half waveplates can be used as continuously adjustable polarization rotators. Half waveplates are used in rotating the plane of polarization, electro-optic modulation and as a variable ratio beamsplitter when used in conjunction with a polarization cube.

Because of fabrication imperfections in making the split waveplate 12, a gap can exist between the two half-wave plates 42 and 44, the gap having a finite size. The size of the gap relative to the input optical beam 9a diameter determines the fraction of the optical signal 9a (therefore the signal power) that passes through the gap compared to the optical signal power passing through the half-wave plates 42 and 44.

The polarization of the light passing through the gap is typically not changed and will typically differ from the polarization of the light passing through the half-wave plates 42 and 44. This can limit the performance of the split waveplate 12. To reduce this effect, the split waveplates halves 42 and 44 can be carefully polished and assembled to minimize the gap. In addition, the optical input beam 9a can be expanded to produce a larger spot, or larger diameter imaged input signal 9b, on the split waveplate 12. This minimizes the fraction of the input beam 9a energy passing through the gap compared to the fraction of the input beam 9a passing through the half-wave plates 42 and 44. Finally, the orientation of the axis of one of the split waveplates can be oriented with the polarization axis of the system 8. For example, the orientation of the gap can be aligned with that of the first half plate 42 and also aligned with preferred orientation of a PPLN 28. Then the conversion efficiency in the gap will be the same as that in the split waveplate half having the same orientation as the polarizing element. The gap can then be viewed as an extension of that wave plate half 42, and does not degrade the performance.

Continuing to refer to FIGS. 1 and 2A, the imaging lens 10 images the diverged input signal 9a on the split waveplate 12 as imaged input signal 9b such that the imaged input signal 9b is bisected by the split waveplate 12 into two halves spatially at bisection line 47.

Thus, one half of the imaged input signal 9b passes through the first half 42 of the split waveplate 12 resulting in a first split input signal 9c1 rotated signal having a first polarization direction. The other half of the imaged input signal 9b passes through the second half 44 of the split waveplate 12 resulting in a second split input signal 9c2 having a second polarization direction.

As already explained, the effect of the half waveplate 12 is to rotate the polarization of the input signal 9b twice of that of the angle of incidence at which the imaged input signal 9b impinges the split waveplate 12. Thus after passing through the split waveplate 12, the first half of the imaged signal 9b is spatially rotated to the first polarization direction 9c1, and the second half of the imaged signal 9b is spatially rotated to the second polarization direction. Since the second half 44 of the split waveplate 12 is 45 degrees off relative to the first half 42 of the split waveplate 12, the second polarization direction 9c2 is 90 degrees, or orthogonal, relative to the first polarized direction.

In sum, after passing through the split waveplate 12, one half, or 50 percent, of the input signal 9 (thus the input signal power) is polarized along the first direction and the other 50 percent of the input signal 9 power is polarized along the second direction orthogonal to the first direction.

Referring again to FIG. 1, the split input signals 9c1 and 9c2 are diverged by a diverging lens 14 into diverged input signals 9d1 and 9d2. The diverged input signals are collimated by a collimating, lens 16 into collimated input signals 9e1 and 9e2. The collimated input signals 9e1 and 9e2 pass through a dichroic splitter 18. The dichroic splitter allows the collimated input signals 9e1 and 9e2 to pass through while reflecting pulses from a probe signal 19 to direct the probe signal to a sum frequency generator 28, or the PPLN 28, in the illustrated embodiment.

The probe signal 19 is generated by a probe pulse generator 20. In the illustrated embodiment, the probe pulse generator 20 generates 1550 nm pulses that are frequency doubled by a frequency doubler 22 to 780 nm pulses. Any remaining portions of the 1550 nm pulses after the frequency doubling operation is filtered out by a filter 24. The frequency doubled probe signal 19 is reflected by the dichroic splitter 18 toward the PPLN 28.

Both the probe signal 19 and the collimated input signals 9e1 and 9e2 are focused by focusing lens 26 on the sum frequency generator 28 which, in the present embodiment, is a PPLN 28. The PPLN 28 samples the focused input signal 9e1 and 9e2 by generating a product signal 11 of the power of the focused input signals 9f1 and 9f2 for the duration of the probe signal 19. The PPLN 28 can be aligned to one of the two polarization directions, for example the first direction, for maximum efficiency as already discussed above.

The sum signal is directed at a detector 30 for detection and conversion into its corresponding electrical signal.

The techniques for using the PPLN 28 and the detector 30 for detection of optical signals, for example, the focused signals 9f1 and 9f2, are known in the art. See, for example, "Highly Sensitive and Time-Resolving Optical Sampling System Using thin PPLN Crystal" by S. Nogiwa, et al., Electron Lett, Vol. 36, IEEE 2000.

Figure 2B:
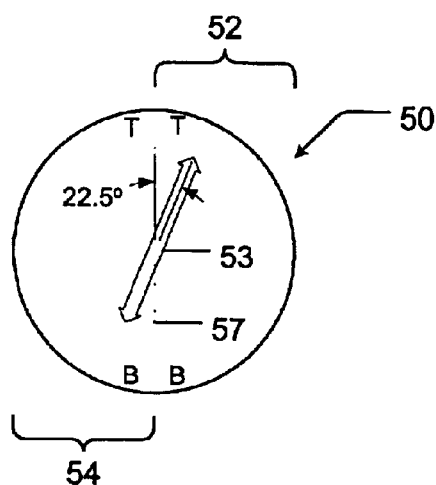
FIG. 2B illustrates a waveplate having a single polarized direction.
Figure 2C:
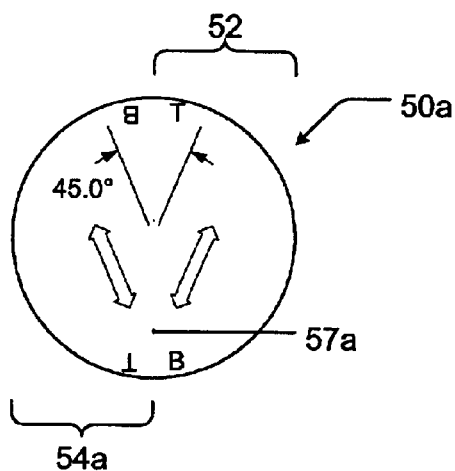
FIG. 2C illustrates a split waveplate according to another embodiment of the present invention.

Referring again the FIG. 2A, the split waveplate 12 can be fabricated using two pieces of waveplates 42 and 44 joined at line 47. Alternatively, the split waveplate 12 can be fabricated using one piece of waveplate. This technique is illustrated by FIGS. 2B and 2C. Referring to FIGS. 2B and 2C, a single waveplate 50 having a directional refractive index along a first direction as indicated by arrow 53 is cut along line 57 which is 22.5 degrees off relative to the first direction 55 resulting in a first portion 52 and a second portion 54. Next, the second portion 54 is flipped. Then, the split waveplate 50a is formed by joining the first portion 52 and the flipped second portion 54a along the line of the cut 57 such that the direction of the refractive index of the flipped second portion 54a is 45 degrees off from the direction of the refractive index of the first portion 52. The waveplate 50 can be a half waveplate. This approach has the advantage that the thickness in each half is the same because they come from the same substrate. Thus, the optical path length and propagation delay in each half is also the same. This can be important in an optical sampling system where the sampling pulsewidth can be as narrow as a few hundred femto seconds (fs)

Although specific embodiments of the invention have been described and illustrated, the invention is not to be limited to the specific forms or arrangements of parts so described and illustrated. The invention is limited only by the claims.

What is claims is:

1. An apparatus for sampling optical input signal, the apparatus comprising:
    a split waveplate for spatially rotating polarization direction of a first portion of the input signal to a first rotated direction and spatially rotating polarization direction of a second portion of the input signal to a second rotated direction orthogonal to the first rotated direction; and
    a sum frequency generator for generating sum frequency of the rotated input signal.

2. The apparatus recited in claim 1 wherein the sum frequency generator is periodically poled lithium niobate (PPLN).

3. The apparatus recited in claim 2 wherein the sum frequency generator is oriented in the first rotated direction.

4. The apparatus recited in claim 1 further comprising:
    a probe pulse source for providing a probe pulse;
    a dichroic splitter for directing the probe pulse toward the sum frequency generator.

5. A method of sampling optical input signal, the method comprising:
    spatially rotating the input signal such that one half of the power of the input signal is within a first polarized portion of the input signal while the other half of the power of the input signal is within a second polarized portion of the input signal, the second polarized portion being orthogonally polarized relative to the first polarized portion and
    sampling the spatially rotated input signal.

6. The method of sampling optical input signal recited in claim 5 wherein the spatial rotation is performed using a split waveplate.

7. The method of sampling optical input signal recited in claim 5 wherein the step of sampling is performed using periodically poled lithium niobate (PPLN) oriented in the first rotated direction.

* * * * *